3,261,846
RECOVERY OF TRIMELLITIC ACID PRODUCT
Delbert H. Meyer, Highland, Ind., assignor to Standard Oil Company, Chicago, Ill., a corporation of Indiana
No Drawing. Filed June 30, 1961, Ser. No. 120,962
11 Claims. (Cl. 260—346.4)

This invention relates to the recovery of benzene tricarboxylic acid products from a reaction mixture produced by the liquid phase oxidation with molecular oxygen of a trialkylbenzene at elevated temperature and pressure in the presence of an oxidation catalyst and an aliphatic acid reaction solvent. More particularly, this invention pertains to the recovery of benzene tricarboxylic acids from said liquid phase oxidation processes wherein the reaction solvent is acetic acid and especially pertains to the recovery of trimellitic acid anhydride (carboxy phthalic anhydride) from the reaction mixture obtained when a 1,2,4-trialkylbenzene is oxidized with molecular oxygen in the liquid phase at elevated temperature and pressure in the presence of acetic acid.

A benzene tricarboxylic acid such as trimellitic acid and trimesic acid can be prepared by oxidizing a 1,2,4-trialkylbenzene such as pseudocumene or a 1,3,5-trialkylbenzene such as mesitylene, respectively, with chromic acid, potassium permanganate, nitric acid or molecular oxygen. The processes employing molecular oxygen are conveniently carried out at temperatures of from 150 to 500° C., and at pressures to maintain a liquid phase in the oxidation zone and in the presence of an oxidation catalyst provided by ions of heavy metal of variable valences such as the variable valence metals having an atomic number 23–84. Such metals as manganese, cobalt, nickel, chromium, vanadium, molybdenum, tungsten, tin, cerium and iron are especially useful heavy metals of the variable valence metal catalysts. It is also convenient to carry out these oxidations in the presence of a reaction medium solvent either to maintain the catalyst in solution or to dissolve the hydrocarbon to be oxidized or to provide a means for removing heat of reaction or for any one or all of these purposes. The aliphatic monocarboxylic acids have been found to be useful reaction medium solvents and of these the lower aliphatic monocarboxylic acids containing 2 to 8 carbon atoms have been found to be exceptionally useful. Of the lower aliphatic monocarboxylic acid reaction solvents, acetic acid has become the solvent of choice for commercial liquid phase oxidation processes.

When the trialkylbenzenes hereinbefore mentioned are oxidized to their respective tricarboxylic acids in the presence of the aliphatic monocarboxylic acid as reaction solvent, the recovery of the resulting trimellitic or trimesic acid from the resulting reaction mixture has been accomplished by either filtering the resulting reaction mixture at the temperature at which the reaction is carried out, which may be as high as 480° F., or by cooling the reaction mixture to a temperature in the range of 110 to 150° F. and then recovering the benzene tricarboxylic acid by filtration. When either of these methods is employed, there remains dissolved in the mother liquor a substantial amount of the benzene tricarboxylic acid produced in the oxidation process. The amount of benzene tricarboxylic acid in the mother liquor will, of course, depend not only on the temperature at which filtration is carried out but also on the amount of reaction solvent present in the oxidation reaction; i.e., the ratio of solvent to hydrocarbon in the oxidation reaction. In most cases the mother liquor is further processed to recover at least the solvent. This may be accomplished by stripping wet solvent from the mother liquor, leaving behind a residue containing oxidation catalyst, benzene tricarboxylic acid and/or its anhydride and oxidation intermediates and by-products. The recovery of the benzene tricarboxylic acid or its anhydride from such a residue mixture should be carried out to obtain as high a yield of benzene tricarboxylic acid as is commercially feasible, but the residue in general is difficult to handle or cannot be further processed by conventional means readily adaptable to commercial operations. In some cases the oxidation intermediates and reaction by-products appear to form some material which, if recycled to oxidation, has an inhibiting effect thereon.

The mother liquors obtained from the process as hereinabove described may contain anywhere from 15 to 50% of the benzene tricarboxylic acid produced by the oxidation reaction. Thus, it is apparent that there is a need for a recovery process readily adaptable to commercial operations by which a higher initial yield of benzene tricarboxylic acid or its anhydride may be obtained.

A process has been discovered whereby a much higher proportion of benzene tricarboxylic acid may be recovered from the mixture resulting from the oxidation of a trialkylbenzene in a liquid phase oxidation system, especially when the trialkylbenzene is oxidized in the presence of aliphatic monocarboxylic acid containing 2 to 8 carbon atoms and more, particularly where the aliphatic monocarboxylic acid is acetic acid. The process of this invention comprises combining the total fluid effluent from the oxidation reaction with an amount of trialkylbenzene, preferably the same as the trialkylbenzene oxidized, in an amount in the range of 0.2 to 10 parts per part of total solid by weight in the reactor effluent. The resulting mixture is heated under distillation conditions which remove an azeotropic mixture containing an aqueous phase and a hydrocarbon phase. When the trialkylbenzene in an amount approaching the lower portion of the range hereinbefore set forth is employed, the azeotropic mixture is separated, the aqueous phase is removed and the hydrocarbon phase is recycled to the distillation apparatus. When the trialkylbenzene hydrocarbon is employed in amounts greater than the minimum of about 1.2 to 2.0 parts per part of water by weight required to remove the water from the reaction mixture as azeotropic composition, then the hydrocarbon separated from the azeotropic mixture need not be recycled. It is, of course, advantageous to remove the aqueous phase from the azeotropic mixture condensate so that the quantity of water removed from the mixture can be readily determined. After all of the water has been removed from the reaction mixture, the remainder of the aliphatic monocarboxylic acid, especially acetic acid, can be removed as a substantially anhydrous condensate and can be recycled directly to the oxidation step. The aqueous layer containing only a small amount of water soluble monocarboxylic acid such as acetic acid can be fractionated to recover acetic acid of a strength of from 95 to 100%. When acetic acid is the reaction solvent, the aqueous acetic acid layer separated from the azeotropic mixture amounts to only about 15 to 25% of the total weight acetic acid which, by the previously discussed processes, would have to be dehydrated.

After distilling off the anhydrous reaction solvent, there remains the benzene tricarboxylic acid, catalyst, oxidation intermediates, by-products and trialkylbenzene hydrocarbon when used in excess of the minimum to remove water. The benzene tricarboxylic acid may be recovered from this residual mixture by a number of different ways. Since trimellitic acid and trimellitic anhydride are not appreciably soluble in their corresponding trialkylbenzenes, these acids may be recovered from the above-mentioned residue containing said trialkylbenzenes by heating the residual mixture with the trialkylbenzene hydrocarbon to dissolve a substantial portion of intermediate oxidation products and by-products. The resulting hot mixture is filtered to obtain as the filter cake the benzene tricarboxylic acid. The filtrate containing oxidation intermediates and by-products is preferably distilled to recover the trialkylbenzene hydrocarbon for recycle to the oxidation reaction. The benzene tricarboxylic acid obtained as the filter cake can be further purified by recrystallization or, in the case of trimellitic acid, the filter cake, wet with hydrocarbon, can be melted, residual hydrocarbon solvent distilled therefrom, the trimellitic acid converted to its anhydride and the anhydride as an exceptionally pure product can be obtained by fractional distillation.

The process of this invention is especially applicable to the recovery of trimellitic acid as its intra-molecular anhydride (carboxy phthalic anhydride) from oxidation reaction mixtures containing acetic acid, variable valence heavy metal oxidation catalysts resulting from the liquid phase oxidation of 1,2,4-trialkylbenzenes. For the recovery of a trimellitic acid as its intra-molecular anhydride, the hereinbefore described initial steps of removing aqueous acetic acid and substantially anhydrous acetic acid are first conducted in the presence of added trialkylbenzene. Preferably the process of this invention is used in conjunction with the recovery of trimellitic anhydride is carried out with 3 to 5 parts of trialkylbenzene per part of total solids by weight in the total fluid oxidation reactor effluent. This ratio of trialkylbenzene to solids in the oxidation reaction effluent is preferred because it provides an amount of trialkylbenzene sufficient for recycle to the oxidation reaction after separation of trimellitic acid and/or its anhydride from the residue remaining after the removal of substantially anhydrous acetic acid.

One route to the recovery of trimellitic anhydride has been hereinbefore described. This route comprises heating the mixture remaining after anhydrous acetic acid is removed to dissolve oxidation intermediates and by-products in the trialkylbenzene, filtering the hot mixture to obtain as a filter cake trimellitic acid, dehydrating trimellitic acid in the molten state and fractionating the resulting trimellitic anhydride.

A second route to the recovery of trimellitic anhydride after substantially anhydrous acetic acid is removed involves heating the mixture containing trimellitic acid and trialkylbenzene under reflux conditions to dehydrate trimellitic acid and form its anhydride. After dehydration is substantially complete, trimellitic anhydride is in solution in the trialkylbenzene. Thereafter, trimellitic anhydride can be recovered in one of two ways. According to the first, the hot solution of trimellitic anhydride and trialkylbenzene is filtered to remove materials insoluble therein, mainly the metal oxidation catalysts which are present in the form of salts. The resulting filtrate is distilled to remove trialkylbenzene hydrocarbon as a first fraction, to remove low boiling oxidation intermediates as a second fraction, and to recover a highly pure trimellitic anhydride as the third fraction, leaving a residue containing only a minor portion of the original trimellitic acid in the form of its anhydride together with impurities boiling above trimellitic anhydride. This residue may be discarded or processed in any desired manner to recover materials contained therein.

Still another route for recovering trimellitic anhydride from the solution thereof in the trialkylbenzene involves filtration of the hydrocarbon solution of the anhydride, again to remove insolubles which are mainly salt forms of the heavy metal oxidation catalyst. The filtrate is then cooled to about 25° C., whereupon trimellitic anhydride forms as a crystalline precipitate. The precipitated trimellitic anhydride is then recovered by any desirable means for separating a solid phase from a liquid phase such as by filtration, decantation, centrifugation and the like. The recovered solid trimellitic anhydride is dried to remove adhering trialkylbenzene solvent. Desirably the trialkylbenzene solvent adhering to trimellitic anhydride can be removed by washing the trimellitic anhydride precipitate with a paraffinic hydrocarbon such as pentane, hexane, heptane and the like. Such paraffinic hydrocarbons are more readily removed by drying at lower temperatures than are trialkylbenzenes. The washed and dried trimellitic anhydride may be further purified by melting, followed by fractional distillation of anhydride melt. The filtrate from the 25° C. crystallization is preferably distilled to recover the trialkylbenzene solvent for recycle to the oxidation step to supply the trialkylbenzene to be oxidized to trimellitic acid.

The processes hereinbefore set forth are particularly advantageous for the recovery of trimesic acid and trimellitic anhydride from the total fluid reactor effluent resulting from the oxidation of 1,3,5- and 1,2,4-trialkylbenzenes, respectively, in liquid phase systems carried out at elevated temperatures and pressures employing molecular oxygen containing gas as the oxidant. Said oxidations are carried out commercially in an oxidation zone wherein acetic acid employed as the reaction solvent is maintained in the liquid phase and heavy metal oxidation catalysts promoted with bromine in the ionic, elemental or combined form are employed as reaction catalyst. Cobalt, manganese or mixtures thereof are the preferred heavy metal oxidation catalysts and are employed in such forms as are soluble in or form acetates in acetic acid. The use of bromine promoted heavy metals as a catalyst system for liquid phase oxidation systems is now known to those skilled in the art. Such oxidation systems for preparing trimellitic acid or trimesic acid are preferably carried out employing from 1.5 to 5 parts acetic acid per part of trialkylbenzene hydrocarbon. The use of the preferred amount of acetic acid based on the trialkylbenzene hydrocarbon appears to provide a more efficient oxidation system than provided by the use of lower or higher ratios of acetic acid to trialkylbenzene hydrocarbon.

The process of this invention for the recovery of trimellitic anhydride is not dependent on the source of oxidation reaction mixture. The process of this invention may be carried out using the total fluid reaction mixture obtained by nitric acid oxidation of, for example, mesitylene or pseudocumene in the presence of acetic acid to trimesic acid or trimellitic acid, respectively. The water introduced with the nitric acid, as well as the water by-product of oxidation, is readily removed by the distillation with the azeotropic mixture containing an aqueous acetic phase and a trialkylbenzene hydrocarbon phase. The process of this invention is also applicable to the recovery of trimellitic anhydride from the liquid phase air oxidations of 1,2,4-trialkylbenzenes using only heavy metal oxidation catalysts (i.e., where no bromine promoter is employed). However, since these latter liquid phase air oxidations are not as efficient and are far less vigorous than provided by the bromine promoted catalyst system, the use of the process of this invention in connection therewith will understandably not be described herein. The principles of the process of this invention, when applied thereto, are little different from the specific embodiments hereinafter described in detail, and one skilled in the art will appreciate the application of the process of this invention to those less efficient liquid phase air oxidations.

It is not essential to the process of this invention that the trialkylbenzene added to the total fluid oxidation reaction mixture be the same as that originally oxidized. However, for most efficient handling, storage and transfer of materials, it is preferred that the trialkylbenezene added to the total fluid effluent from the oxidation be the same as the trialkylbenzene oxidized; for example, where pseudocumene is oxidized to trimellitic acid, it is preferred to add pseudocumene to the total fluid oxidation reaction mixture and thereafter to proceed according to the process of this invention. Likewise, mesitylene is added to the total fluid reaction mixture obtained during the preparation of trimesic acid.

The process of this invention can be illustrated by the following examples.

The total fluid reactor effluents employed in the examples which follow are obtained by the air oxidation of a pseudocumene charge stock containing 90 to 95% pseudocumene. The oxidation is carried out in a corrosion resistant oxidation reactor having an air charging line entering the bottom thereof, a vapor transfer line from the top thereof for conducting a gasiform mixture from the reactor to the condenser. Acetic acid, hydrocarbon and by-product water are condensed from the gasiform mixture and are returned to the oxidation zone in the reaction vessel. The oxidation reactor is charged with the following materials in the weight proportions indicated:

| | Parts |
|---|---|
| Pseudocumene charge stock | 100 |
| Acetic acid (95 to 100%) | 300 |
| Cobalt and manganese | 0.98 |
| Tetrabromoethane | 0.92 |

The oxidations are carried out at 400–430° F. and 350 p.s.i.g. constant pressure until the exit gas contains 18% oxygen by volume.

Example I

A charge containing 1040 g. of total reactor effluent containing 28% total solids, 200 g. mother liquor (12.2% total solids) obtained from the recovery of trimellitic acid by filtering a previous fluid reactor effluent, 1200 ml. of pseudocumene, and 2 ml. of sulfuric acid is added to a 5-liter flask equipped with a thermometer for measuring pot temperature, a mechanical stirrer and a 30-tray Oldershaw column with a vapor dividing head for setting reflux ratio. Initially, reflux ratio is set at 5:1 and cuts taken overhead give an aqueous layer and a pseudocumene layer. After the water has been removed, the overhead distillate contains one layer (acetic acid) and this is distilled at 1:1 reflux ratio. When the overhead temperature rises to 121° C., with a pot temperature of 171° C., an additional 2 ml. of sulfuric acid are added, and the distillation continues for 2 hours at 30:1 influx ratio. The resulting distillation residue slurry is filtered hot, and the filtrate is distilled at atmospheric pressure to remove the pseudocumene. The residue is distilled at reduced pressure to give forecut, heartcut and residue. The forecut contains some unremoved solvent and water. The heartcut is taken at 10 mm. Hg and 240° C.

Example II

A slurry of 1040 g. of total reactor effluent containing 28% total solids, 1045 ml. of pseudocumene and 2 ml. of sulfuric acid is charged to a 5-liter round bottom flask equipped as described in Example I for solvent removal and dehydration. After the acetic acid and water are removed, an additional 2 ml. of sulfuric acid are added, and the distillation is continued at 30:1 reflux ratio for 5 hours, removing a total of 263 ml. of pseudocumene (as water azeotrope and final distillate). The resultant distillation bottoms are filtered hot (the pseudocumene insolubles are in the form of an oil). The filtrate is cooled to 25° C. and filtered. The product cake is dried and distilled at reduced pressure to obtain a forecut and heartcut. Again, the first cut of the product distillation has both liquid and solid present, indicating incomplete solvent removal.

Example III

A slurry of 1000 g. of total reactor effluent containing 29.8% total solids, 1140 ml. of pseudocumene and 5 ml. of phosphoric acid is charged to a 5-liter round bottom flask equipped as described in Example I for solvent removal and dehydration. After the acetic acid and water are removed, the distillation is continued for an additional four hours at a 30:1 reflux ratio. Nineteen ml. of water and 177 ml. of pseudocumene are taken overhead (the 19 ml. of water represents 92% of theory). The hot distillate bottoms are filtered. (The insoluble residue is in the form of an oil.) The filtrate is allowed to cool to 25° C. and filtered. The pseudocumene solvent is washed from the cake with pentane, and the cake is then air dried, and distilled at reduced pressure to give a forecut, heartcut and residue. Removal of adsorbed pseudocumene is difficult by normal drying techniques, but washing with pentane removes the pseudocumene completely and does not take any solids with it.

Example IV

A slurry of 1,000 g. of total reactor effluent containing 29.8% total solids and 1,142 ml. of pseudocumene (no acid dehydration catalyst) is charged to a 5-liter round bottom flask, equipped as described in Example I for solvent removal and dehydration. The acetic acid and water are distilled as before. After the overhead temperature reaches 162° C., and the bottoms temperature 171° C., the distillation-residue slurry is filtered hot, and the filtrate is cooled to 25° C. The product cake is dehydrated at 240° C. with inert gas stream and distilled to give forecut, heartcut and residue. The cooled filtrate is filtered, and the pseudocumene filtrate is distilled to a residue temperature of 240° C.

The purity of trimellitic anhydride can be determined in various ways. The theoretical acid number of the anhydride is 876 milligrams KOH per gram of anhydride. A comparison of the acid number of the product with the theoretical will give an indication of the purity of the anhydride. However, an acid number of the product anhydride lower than 876 can be the result of the presence of trimellitic acid. Another measurement of purity would be the determination of the anhydride content of the product. Two qualitative evaluations of trimellitic anhydride quality have been developed. These evaluations measure the color or clarity of derivatives of trimellitic anhydride. One evaluation is the measurement of the color of the triethylene glycol derivative of trimellitic anhydride, and is hereinafter referred to as "TEG Color." The other evaluation is a measure of the transparency of the product obtained by reacting an epoxy resin with trimellitic anhydride and is hereinafter referred to as "Epoxy Clarity."

"TEG Color" evaluation is made by preparing the product of the reaction of 4 grams of trimellitic anhydride and 28.5 ml. triethylene glycol at 500° F. with nitrogen purge. The liquid reaction product is cooled to room temperature, diluted with isopropyl alcohol 1:1 and the color of the dilute solution is compared with APHA (Hagen platinum-cobalt colors) standards with a Fisher electrophotometer using a 650μ red filter and a 425μ blue filter. The TEG Color is, therefore, an APHA color.

"Epoxy Clarity" is determined as follows. An epoxy resin, such as sold by Shell as Epon 828 resin, is heated to 78° C. with constant stirring. One part of trimellitic anhydride is added for each three parts by weight of epoxy resin. Stirring is continued while the mixture is heated until complete solution occurs, 125 to 160° C. Thereafter the hot liquid is placed in a mold to provide a depth of about 1.0 millimeter and held at 200° for 60 minutes. The resulting solid varies in clarity depending on the terephthalic acid content of the anhydride. Clarity standards can be prepared in the same manner as above described and a number range of 1 to 5 assigned according to the known percent of terephthalic acid added to the anhydride.

| Clarity number: | Terephthalic acid content, percent |
|---|---|
| 1 | 0.0 |
| 2 | 0.10 |
| 3 | 0.25 |
| 4 | 0.50 |
| 5 | 1.0 |

A summary of heartcut product recovery and quality of these products from Examples I through IV is listed below.

HEARTCUT PRODUCT RECOVERY SUMMARY

| Example No. | Percent of TMLA Charged Recovered as TMA Heartcut | TMA Properties | | |
|---|---|---|---|---|
| | | Epoxy Clarity | TEG Color | Acid No. |
| I | 61 | 2-3 | 370 | 870 |
| II | 68.6 | 4-5 | 420 | 868 |
| III | 74 | 3-4 | 220 | |
| IV | 92 | 4 | 130 | 878 |

Example V

Pseudocumene is oxidized at 400° F. and 340 p.s.i.g. with air in a batch oxidation wherein there is charged to the oxidation vessel pseudocumene, glacial acetic acid, cobalt and manganese acetates as their tetrahydrates, and and ammonium bromide in the following proportions by weight:

| | |
|---|---|
| Pseudocumene | 100 |
| Acetic acid (100%) | 400 |
| Cobalt acetate·4H$_2$O | 1.5 |
| Manganese Acetate·4H$_2$O | 2.5 |
| Ammonium bromide | 1.0 |

The total liquid reactor effluent contains on a 1000 parts by weight basis the following also on a weight basis:

| | |
|---|---|
| Trimellitic acid | 242.0 |
| Other solids [1] | 56.0 |
| Acetic acid | 619.5 |
| Water | 82.5 |

[1] "Other solids" compose oxidation intermediates, oxidation by-products and catalyst residues.

To 1000 parts of reactor effluent at about 367° F. and 100 p.s.i.g. there is added 1000 parts of pseudocumene and the mixture is charged to distillation at atmospheric pressure until the temperature of the vapor at the top of the column is 325° F. and the temperature of the liquid at the bottom is 340° F. There is collected a first fraction of 258 parts containing on a weight basis:

| | |
|---|---|
| Water | 82.5 |
| Acetic acid | 104.0 |
| Pseudocumene | 71.5 | a second fraction containing 515.5 parts by weight of 99% acetic acid, and 126 parts by weight of a third fraction comprising mainly pseudocumene.

The residue from the removal of acetic acid and water, 1100 parts by weight contains 298 parts total solids and 802 parts pseudocumene. This residue is filtered at 340° F. The filter cake wet with pseudocumene contains 268.6 parts of solids and 29 parts of pseudocumene on a weight basis. The filtrate contains 773.3 parts of pseudocumene and 29.4 parts of solids on a weight basis. The hot filtrate is cooled to 77° F. and filtered at 75 to 77° F. to obtain 36 parts of cake containing 18.4 parts of pseudocumene and 17.6 parts of solids of which 4 parts are trimellitic acid. The 75 to 77° F. filtrate is distilled at atmospheric pressure and about 465° F. to recover 736 parts of pseudocumene leaving 31 parts of fluid residue containing 11.8 parts solids and 19.2 parts of pseudocumene. This residue may be discarded or dried to recover the pseudocumene and the dried solids, mainly oxidation intermediates and by-products with some catalyst residues, are discarded. If desired, the filter cake from the 75 to 77° F. filtration, the residue from the pseudocumene recovery and the residue from the hereinafter described trimellitic acid dehydration step may be combined for recovery of the catalyst metals content of these residues. The filter cake from the 340° F. filtration is heated to about 465° F. to melt the cake and convert the trimellitic acid to its intra-molecular anhydride. The resulting molten mixture, 248 parts, contains 217.6 parts of the anhydride. This crude anhydride melt is fractionated at reduced pressure of 10 mm. Hg. and 465° F. to obtain a first fraction containing 2.1 parts of anhydride and 0.3 part of water of dehydration, a heartcut of 202.2 parts of anhydride, and leaving a residue of 43.9 parts of which 13.3 parts is the anhydride. The heartcut anhydride represents about 94% of that charged to the fractionator and 92% of that resulting from the oxidation.

What is claimed is:

1. In the preparation of trimellitic acid product selected from the class consisting of trimellitic acid and the intra-molecular anhydride of trimellitic acid resulting from the catalytic liquid phase oxidation of pseudocumene with molecular oxygen in the presence of acetic acid as reaction medium at elevated temperature and elevated pressure in an oxidation zone to produce trimellitic acid, the recovery of trimellitic acid product which consists of combining the total fluid effluent containing trimellitic acid from said oxidation zone with pseudocumene in an amount in the range of from 0.2 to 10 parts per part of total solids by weight in said total effluent; distilling the resulting mixture to recover (a) an azeotropic mixture containing an aqueous acetic acid phase and a pseudocumene phase, (b) dehydrated acetic acid and (c) said trimellitic acid product as residue.

2. The process of claim 1 including the additional steps of separating from said azeotropic mixture the aqueous acetic acid and distilling the aqueous acetic acid to obtain acetic acid of 95 to 100% strength.

3. The process of claim 2 including the additional step of recycling to the first distillation step at least a portion of the pseudocumene phase of the azeotropic mixture.

4. In the preparation of trimellitic acid resulting from the catalytic liquid phase oxidation of pseudocumene with molecular oxygen in the presence of acetic acid as reaction medium at elevated temperature and elevated pressure in an oxidation zone to produce trimellitic acid, the recovery of trimellitic acid product which consists of combining the total fluid effluent containing trimellitic acid from said oxidation zone with pseudocumene in an amount in the range of from 3 to 5 parts per part of total solids by weight in said total effluent; distilling the resulting mixture to recover (a) an azeotropic mixture containing an aqueous acetic acid phase and a pseudocumene phase, (b) dehydrated acetic acid and (c) a residue containing trimellitic acid and pseudocumene and substantially free from acetic acid and water.

5. The process of claim 4 including the additional steps of heating the distillation residue to boil pseudocumene under reflux conditions while removing an azeotropic mixture containing pseudocumene and water resulting from dehydration of trimellitic acid to its intra-molecular anhydride, filtering the remaining mixture, distilling the filtrate, to recover pseudocumene and the intra-molecular anhydride of trimellitic acid.

6. The process of claim 5 wherein the dehydration of trimellitic acid is carried out in the presence of a strong mineral acid.

7. The process of claim 4 including the additional steps of heating the distillation residue in the presence of a strong mineral acid to boil pseudocumene under reflux conditions while removing an azeotropic mixture containing pseudocumene and water resulting from dehydration of trimellitic acid to its intra-molecular anhydride, filtering the remaining mixture, cooling the filtrate to 25° C. whereby the intra-molecular anhydride of trimellitic acid precipitates as a crystalline product, and recovering the crystalline anhydride precipitate.

8. The process of claim 7 including the additional steps of washing the recovered crystalline anhydride product with a normally liquid paraffinic hydrocarbon and drying the washed crystalline product.

9. The process of claim 7 including the additional steps of melting the recovered crystalline anhydride product, heating the melt to 240° C. to distill off pseudocumene, and fractionating the solvent free anhydride to recover a product having an anhydride content of at least 95% by weight.

10. The process of claim 4 including the additional steps of filtering the residue at 165 to 185° C. to obtain a solid trimellitic acid product, melting the solid trimellitic acid product, dehydrating trimellitic acid, and recovering the intra-molecular anhydride of trimellitic acid.

11. In the preparation of trimellitic acid product selected from the class consisting of trimellitic acid and the intra-molecular anhydride of trimellitic acid by oxidizing pseudocumene under liquid phase conditions in an oxidation zone with molecular oxygen in the presence of acetic acid in an amount of from 2 to 5 parts per part of pseudocumene by weight and in the presence of a catalyst comprising manganese, cobalt and bromine ions at a temperature in the range of from 150 to 500° C. and at a pressure to maintain a liquid phase in said oxidation zone; the improved method for recovery of trimellitic acid product which consists of withdrawing from said oxidation zone the resulting total fluid effluent, adding to said fluid effluent from 0.2 to 10 parts pseudocumene by weight per part of solids in said fluid effluent; distilling from the mixture of pseudocumene and said fluid effluent (a) an azeotropic mixture containing an aqueous acetic acid phase and a pseudocumene phase and (b) dehydrated acetic acid leaving a residue containing trimellitic acid, and thereafter recovering said trimellitic acid product from said residue.

References Cited by the Examiner

UNITED STATES PATENTS

| | | | |
|---|---|---|---|
| 2,486,808 | 11/1949 | Steahly | 202—57 |
| 2,509,873 | 5/1950 | McAteer | 260—346.8 |
| 2,833,816 | 5/1958 | Saffer et al. | 260—524 |
| 2,925,425 | 2/1960 | Contois et al. | 260—346.4 |
| 2,962,361 | 11/1960 | Spiller et al. | 260—524 |
| 3,004,067 | 10/1961 | Whitfield et al. | 260—346.7 |
| 3,007,942 | 11/1961 | Burney et al. | 260—346.7 |
| 3,098,095 | 7/1963 | Knobloch et al. | 260—346.7 |

HENRY R. JILES, *Acting Primary Examiner.*

LEON ZITVER, *Examiner.*